(12) United States Patent
Ji (10) Patent No.: US 11,393,267 B2
(45) Date of Patent: Jul. 19, 2022

(54) METHOD AND DEVICE FOR IDENTIFYING VISITOR AND ACCESS CONTROL SYSTEM

(71) Applicant: BOE TECHNOLOGY GROUP CO., LTD., Beijing (CN)

(72) Inventor: Chunyan Ji, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 461 days.

(21) Appl. No.: 16/607,642

(22) PCT Filed: Apr. 15, 2019

(86) PCT No.: PCT/CN2019/082671
§ 371 (c)(1),
(2) Date: Oct. 23, 2019

(87) PCT Pub. No.: WO2019/214401
PCT Pub. Date: Nov. 14, 2019

(65) Prior Publication Data
US 2021/0335068 A1 Oct. 28, 2021

(30) Foreign Application Priority Data
May 11, 2018 (CN) .......................... 201810448348.5

(51) Int. Cl.
*G07C 9/00* (2020.01)
*G06N 20/00* (2019.01)
(Continued)

(52) U.S. Cl.
CPC ......... *G07C 9/00563* (2013.01); *G06N 20/00* (2019.01); *G08C 23/04* (2013.01);
(Continued)

(58) Field of Classification Search
CPC .... G07C 9/00563; G07C 9/257; G06N 20/00; G08C 23/04; H04N 7/183; H04N 7/186;
(Continued)

(56) References Cited

U.S. PATENT DOCUMENTS

2009/0092284 A1* 4/2009 Breed .................... G01S 7/4802
382/103
2014/0138786 A1 5/2014 Peterson et al.
(Continued)

FOREIGN PATENT DOCUMENTS

CN 101281652 A 10/2008
CN 102573239 A 7/2012
(Continued)

OTHER PUBLICATIONS

International Search Report received for PCT Patent Application No. PCT/CN2019/082671, dated Jun. 20, 2019, 6 pages (2 pages of English Translation and 4 pages of Original Document).
(Continued)

*Primary Examiner* — James J Yang
(74) *Attorney, Agent, or Firm* — Womble Bond Dickinson (US) LLP (57) ABSTRACT

The present disclosure relates to a method for identifying a visitor. The method for identifying a visitor is applied in an access control system. The access control system includes a control terminal, a door device and an illumination lamp. The illumination lamp provides lighting for a visitor. The method for identifying a visitor includes: receiving a real-time image of a current visitor outside a door from a door device; obtaining first encoded information extracted from a first optical signal corresponding to environmental light of the visitor's current environment; and identifying the visitor as an authorized visitor when the image matches with a preset image and the first encoded information contains
(Continued)

preset encoded information. The preset image is pre-stored image information of the authorized visitor. The preset encoded information is consistent with encoded information embedded in an optical signal of an illumination lamp for illuminating the environment.

19 Claims, 5 Drawing Sheets (51) Int. Cl.
  G08C 23/04 (2006.01)
  H04N 7/18 (2006.01)
  G06K 9/62 (2022.01)
  G06V 20/52 (2022.01)
  G06V 40/50 (2022.01)
(52) U.S. Cl.
  CPC ........... *H04N 7/183* (2013.01); *G06K 9/6215* (2013.01); *G06V 20/52* (2022.01); *G06V 40/50* (2022.01)
(58) Field of Classification Search
  CPC ...... G06K 9/6215; G06V 20/52; G06V 40/50; G06V 40/10; G06V 40/172
  See application file for complete search history.

(56) References Cited

U.S. PATENT DOCUMENTS

| | | | | |
|---|---|---|---|---|
| 2015/0278977 A1* | 10/2015 | Roller | ................. | G06V 40/172 705/325 |
| 2016/0328896 A1 | 11/2016 | Zheng et al. | | |
| 2017/0124421 A1* | 5/2017 | Van Eeuwijk | ......... | G06V 10/60 |
| 2017/0206721 A1 | 7/2017 | Koo | | |
| 2018/0005020 A1 | 1/2018 | Rieul et al. | | |

FOREIGN PATENT DOCUMENTS

| | | | |
|---|---|---|---|
| CN | 103116913 A | 5/2013 | |
| CN | 103716577 A | 4/2014 | |
| CN | 104361664 A | 2/2015 | |
| CN | 104766039 A | 7/2015 | |
| CN | 105427413 A | 3/2016 | |
| CN | 105453524 A | 3/2016 | |
| CN | 106121473 A | 11/2016 | |
| CN | 106295522 A | 1/2017 | |
| CN | 206162736 U | 5/2017 | |
| CN | 107229927 A | 10/2017 | |
| CN | 108694765 A | 10/2018 | |
| EP | 3264329 A1 | 1/2018 | |
| WO | WO-2019226544 A1 * | 11/2019 | ............. G06F 16/53 |

OTHER PUBLICATIONS

Office Action received for Chinese Patent Application No. 201810448348.5, dated Dec. 18, 2019, 11 pages (7 pages of English Translation and 4 pages of Office Action).
Office Action received for Chinese Patent Application No. 201810448348.5, dated Jun. 27, 2019, 39 pages (20 pages of English Translation and 19 pages of Office Action).
Office Action received for Chinese Patent Application No. 201810448348.5, dated Mar. 19, 2020, 37 pages (21 pages of English Translation and 16 pages of Office Action).

* cited by examiner

METHOD AND DEVICE FOR IDENTIFYING VISITOR AND ACCESS CONTROL SYSTEM

CROSS REFERENCE TO RELATED APPLICATIONS

The present application is the U.S. national phase entry of PCT/CN2019/082671, with an international filing date of Apr. 15, 2019, which claims the benefit to Chinese Patent Application No. 201810448348.5, filed on May 11, 2018, the entire disclosures of which are incorporated herein by reference.

FIELD

The present disclosure relates to the field of intelligent testing technologies, and more particularly to a method and device for identifying a visitor, as well as an access control system.

BACKGROUND

In an access control system, intelligent electronic eyes are becoming more and more popular. Current intelligent electronic eyes can record a video on a scene in front of a door. The video can be transmitted to a control terminal in real time for users to check. According to the information acquired by the control terminal, users can grant the access in a remote controllable manner.

SUMMARY

The present disclosure provides a method and device for identifying a visitor, as well as an access control system, so as to solve problems in a related technology.

In the first aspect, the present disclosure provides a method for identifying a visitor. The method for identifying a visitor comprises: receiving a real-time image of a current visitor outside a door from a door device; obtaining first encoded information extracted by the door device from a first optical signal corresponding to environmental light of the visitor's current environment; and identifying the visitor as an authorized visitor when the image matches with a preset image and the first encoded information contains preset encoded information, wherein the preset image is pre-stored image information of the authorized visitor, and the preset encoded information is consistent with encoded information embedded in an optical signal of an illumination lamp for illuminating the environment.

Optionally, the method for identifying a visitor further comprises: sending a control instruction to the door device when the first encoded information does not contain the preset encoded information, the control instruction instructing the door device to control a fill lamp in the environment to be turned on so as to supplement the environmental light; obtaining second encoded information extracted by the door device from a second optical signal corresponding to the environmental light of the environment; identifying the visitor as an authorized visitor when the second encoded information contains the preset encoded information and the image matches with the preset image; and identifying the visitor as an unauthorized visitor when the second encoded information does not contain the preset encoded information.

Optionally, before supplementing the environmental light, the method further comprises: obtaining position information of the visitor relative to the door device as provided by the door device; and setting a target luminous flux of the fill lamp according to the position information and a preset luminous flux. The preset luminous flux is the minimum luminous flux required for transmitting the preset encoded information to the door device. Sending a control instruction to the door device comprises: including the target luminous flux in the control instruction sent to the door device so as to instruct the door device to control the fill lamp to supplement the environmental light according to the target luminous flux.

Optionally, the method for identifying a visitor further comprises: identifying the visitor as an unauthorized visitor when the image does not match with a preset image.

In the second aspect, the present disclosure further provides a method for identifying a visitor. The method for identifying a visitor comprises: acquiring a real-time image of a current visitor outside a door; capturing a first optical signal corresponding to environmental light of the visitor's current environment; extracting first encoded information from the first optical signal; sending the image and the first encoded information to a control terminal so that the control terminal identifies the visitor as an authorized visitor when it is determined that the image matches with a preset image and the first encoded information contains preset encoded information, wherein the preset image is pre-stored image information of the authorized visitor, and the preset encoded information is consistent with encoded information embedded in an optical signal of an illumination lamp for illuminating the environment.

Optionally, the method for identifying a visitor further comprises: receiving a control instruction from a control terminal, and deciding whether to open the door according to the control instruction.

Optionally, the method for identifying a visitor further comprises: receiving a control instruction from a control terminal, and controlling a fill lamp to be turned on according to the control instruction so as to supplement environmental light.

Optionally, the control instruction further comprises information related to a target luminous flux of the fill lamp, and the method further comprises controlling the fill lamp to supplement the environmental light according to the target luminous flux.

In a third aspect, the present disclosure also provides a device for identifying a visitor. The device for identifying a visitor comprises a receiver configured to receive a real-time image of a current visitor outside a door from a door device; a first obtainer configured to obtain first encoded information extracted by the door device from a first optical signal corresponding to environmental light of the visitor's current environment; and a first identifier configured to identify the visitor as an authorized visitor when the first encoded information contains preset encoded information and the image matches with a preset image, wherein the preset image is pre-stored image information of the authorized visitor, and the preset encoded information is consistent with encoded information embedded in an optical signal of an illumination lamp for illuminating the environment.

Optionally, the device for identifying a visitor further comprises: a supplemental light controller configured to send a control instruction to the door device when the first encoded information does not contain the preset encoded information, the control instruction instructing the door device to control a fill lamp in the environment to be turned on so as to supplement the environmental light; a second obtainer configured to obtain second encoded information extracted by the door device from a second optical signal corresponding to the environmental light of the environment; and a second identifier configured to identify the visitor as an authorized visitor when the second encoded information contains the preset encoded information and the image matches with the preset image, and identify the visitor as an unauthorized visitor when the second encoded information does not contain the preset encoded information.

Optionally, the device for identifying a visitor further comprises: a position information obtainer configured to obtain position information of the visitor relative to the door device as provided by the door device in response to no preset encoded information being contained in the first encoded information; and a luminous flux setter configured to set a target luminous flux of the fill lamp according to the position information and a preset luminous flux, wherein the preset luminous flux is the minimum luminous flux required for transmitting the preset encoded information to the door device. The supplemental light controller is configured to include the target luminous flux in the control instruction sent to the door device so as to instruct the door device to control the fill lamp to supplement the environmental light according to the target luminous flux.

Optionally, the device for identifying a visitor further comprises: a third identifier configured to identify the visitor as an unauthorized visitor when the image does not match with the preset image.

In the fourth aspect, the present disclosure also provides a device for identifying a visitor. The device for identifying a visitor comprises: an acquirer configured to acquire a real-time image of a current visitor outside a door; a capturer configured to capture a first optical signal corresponding to environmental light of the visitor's current environment; an extractor configured to extract first encoded information from the first optical signal; a sender configured to send the image and the first encoded information to a control terminal so that the control terminal identifies the visitor as an authorized visitor when it is determined that the image matches with a preset image and the first encoded information contains preset encoded information, wherein the preset image is pre-stored image information of the authorized visitor, and the preset encoded information is consistent with encoded information embedded in an optical signal of an illumination lamp for illuminating the environment.

Optionally, the device for identifying a visitor further comprises: a receiver configured to receive a control instruction from a control terminal. The device for identifying a visitor is configured to decide whether to open the door according to the received control instruction.

Optionally, the device for identifying a visitor further comprises: a controller configured to control a fill lamp in the environment to be turned on so as to supplement environmental light.

Optionally, the control instruction further comprises information related to a target luminous flux of the fill lamp, and the controller is further configured to control the fill lamp to supplement the environmental light according to the target luminous flux.

In the fifth aspect, the present disclosure also provides an access control system, comprising an outdoor component, a door device and a control terminal. The outdoor component comprises an illumination lamp, and preset encoded information is embedded in an optical signal sent by the illumination lamp. The door device comprises: an image acquirer configured to acquire a real-time image of a current visitor outside a door; an extractor configured to capture a first optical signal corresponding to environmental light of the visitor's current environment and extract first encoded information from the first optical signal; and a transmitter configured to transmit the image and the first encoded information. The control terminal is configured to receive an acquired image and the first encoded information from the door device, and to identify the visitor as an authorized visitor when the acquired image matches with a preset image and the first encoded information contains preset encoded information. The preset image is pre-stored image information of the authorized visitor. The preset encoded information is consistent with encoded information embedded in an optical signal of an illumination lamp for illuminating the environment.

Optionally, the outdoor component further comprises a fill lamp. The control terminal is further configured to send a control instruction to the door device when the first encoded information does not contain the preset encoded information, the control instruction instructing the door device to control a fill lamp to be turned on so as to supplement the environmental light.

In the sixth aspect, the present disclosure further provides an access control system, comprising an illumination lamp configured to emit an optical signal in which preset encoded information is embedded; a control terminal comprising the above-mentioned visitor identification device according to the third aspect; and a door device comprising the above-mentioned visitor identification device according to the fourth aspect.

DETAILED DESCRIPTION

In conjunction with the drawings, the technical solution in the embodiment of the present disclosure will be described clearly and completely. Apparently, the embodiments described herein are a part of, not the whole, of the embodiments of the present invention. It shall be understood that the present disclosure shall be considered as an exemplary example of the principle of the present invention, and may not be intended to be limited as the illustrated and described particular embodiment.

The electronic eye of an access control system in related technology can only record a video of the scene in front of the door, which makes it difficult for users to distinguish whether a recorded video of the scene is a real one or a pre-recorded false one. Therefore, it will be impossible to determine whether a visitor in front of the door is a normal visitor or an illegal one. In this case, illegal visitors are likely to use pre-recorded false scenes to deceive electronic eyes and even users to obtain the access grant. This will bring security risks to users.

According to an embodiment of the present disclosure, when identifying a visitor, a control terminal acquires a real-time image of a current visitor outside a door provided by a door device and first encoded information embedded in a first optical signal corresponding to environmental light of the visitor's current environment. When the first encoded information is consistent with the preset encoded information and the acquired image matches with a preset image, the visitor is identified as an authorized visitor. Since the solution according to an embodiment of the present disclosure determines whether a visitor is an authorized visitor based on both the image and the encoded information in the coded light, it ensures that true visitor information is received at a user terminal, improves the reliability of visitor identification and guarantees user security.

Figure 1:
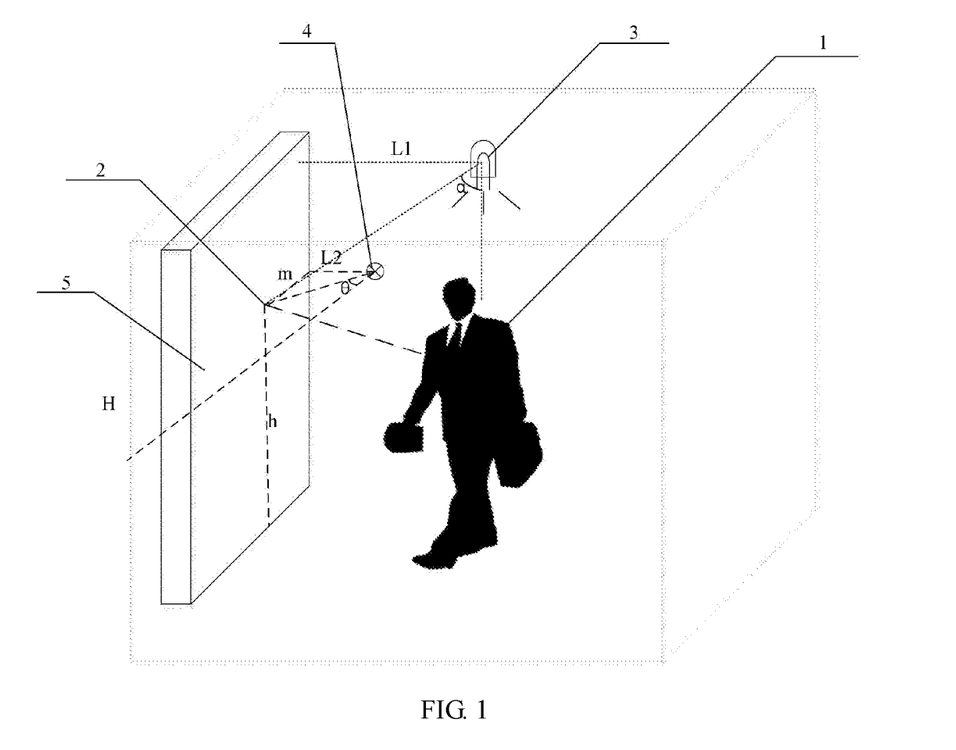
FIG. 1 is a scene schematic view illustrating application of an access control system according to an embodiment of the present disclosure.

FIG. 1 shows a scene schematic view illustrating application of an access control system according to an embodiment of the present disclosure. The scene is exemplified as a space outside a room door. The space comprises a room door, a top wall of the space, a side wall of the space, etc., and further comprises an access control system installed therein. When a visitor 1 enters into the space, the access control system may conduct a visitor identification operation to determine whether the door shall be opened for the visitor to come in.

As shown in FIG. 1, the access control system may comprise a door device and an outdoor component. The door device may comprise, e.g., an electronic eye 2. The electronic eye 2 is installed in a door body 5, and faces horizontally to the front. It would be understood that the space in front of the electronic eye 2 forms its visible area. Exemplarily, the electronic eye 2 may be located in a vertical midline of the door body 5. The distance between the electronic eye 2 and a side edge of the door body may be in, and the distance between the electronic eye 2 and a bottom edge of the door body (namely, an installation height) may be h.

The outdoor component may comprise an illumination lamp 3. The illumination lamp 3 may be mounted in the top wall of the space outside the door, and a vertical plane where the connecting line between the illumination lamp and the electronic eye 2 lies may be perpendicular to the door body 5. The vertical distance between the illumination lamp 3 and the door is L1. The illumination lamp 3 may have dual functions, comprising providing light for the visitor 1 and meanwhile emitting coded light, i.e., emitting an optical signal embedded with encoded information. In some embodiments, additionally, the outdoor component may further comprise a fill lamp 4. The fill lamp 4 may form a synergetic system with the illumination lamp 3 to supplement an amount of light modulated to reach the electronic eye, so as to ensure the stable transmission of encoded information. The fill lamp 4 may be mounted on the side wall of the space outside the door. Exemplarily, the mounting height of the fill lamp 4 may be flush with the electronic eye, and the length of a perpendicular from the fill lamp 4 to the door may be L2. Optionally, the fill lamp 4 is mounted on the side wall and perpendicular thereto, that is, the central line of the light radiation from the fill lamp 4 is perpendicular to the side wall.

The access control system may further comprise a control terminal (not shown) to control the grant and refusal of the access control. Examples of the control terminal may comprise (but are not limited to) a mobile device, a personal digital assistant, a mobile computing device, a smart phone, a cellular phone, a handset, a message transmitting device, a computer, a personal computer (PC), a remote control device, an indoor visual device, etc. In some embodiments, the control terminal may be a user terminal, including, e.g., a smart mobile phone, a desktop computer, a laptop, a notebook, a handheld computer, etc.

The implementation of the embodiment of the present disclosure will be described with reference to the operating example of the method and/or the device block diagram. In this regard, each block may represent a module, code segment or code portion that comprises one or more executable instructions for implementing (multiple) specified logical functions. It should be understood that the blocks in these block diagrams and/or operating examples and the combination of blocks in these block diagrams and/or operating examples can be implemented by radio frequency, analog and/or digital hardware and/or program instructions. These program instructions may be provided to a controller (the controller may comprise one or more general-purpose processors, special-purpose processors, ASIC and/or other programmable data processing devices) so that the instructions executed through the controller and/or other programmable data processing devices may create a device for implementing functions/actions specified in those block diagrams and/or operating blocks. In some alternative implementations, the functions/actions shown in the blocks may not be performed in the order shown in these operating examples. For example, depending on the functions/actions involved, two blocks shown consecutively may actually be executed almost simultaneously, or these blocks may sometimes be executed in an opposite order.

Figure 2:
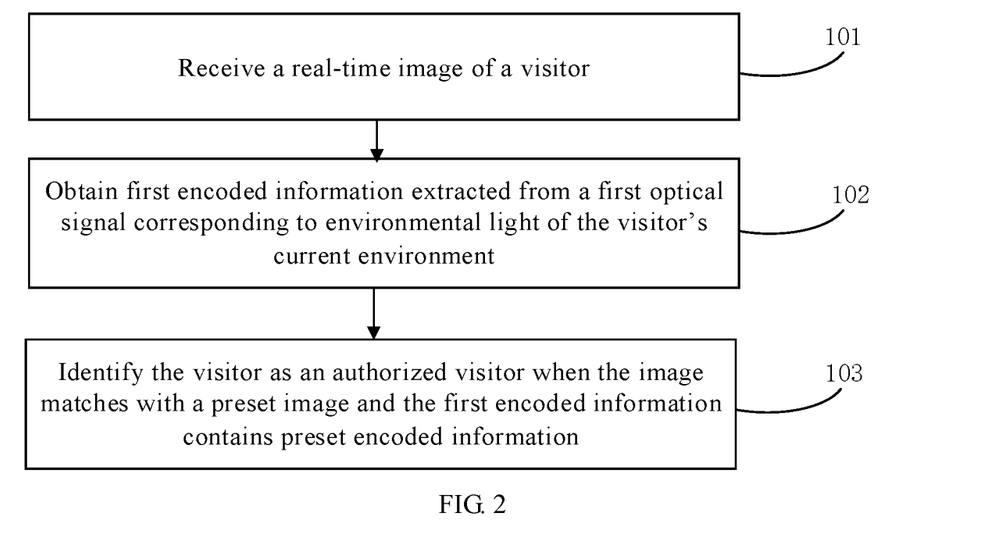
FIG. 2 is a flowchart of a method according to an embodiment of the present disclosure.

FIG. 2 illustrates a flowchart of a method according to an embodiment of the present disclosure. With reference to FIG. 2, a visitor identification method according to an embodiment of the present disclosure may be implemented by a control terminal of an access control system and comprises the following steps.

Step 101, a real-time image of a visitor is received. In some embodiments, when a visitor stands outside a door, that is, when the visitor is in an environment outside a door, the real-time image of the visitor 1 outside the door may be acquired by a door device, such as an electronic eye contained therein (like an image capturing unit integrated therein). The control terminal may communicate with the door device wirelessly or wiredly to receive the image of the visitor acquired thereby. It would be understood that the acquired image is an image containing a human face for the sake of performing face recognition for the visitor. Wireless communication may comprise communication using a family of IEEE 802 standards. It comprises at least wireless technologies, such as Wi-Fi (or wireless fidelity), WiMax, and Bluetooth™. Examples of wired communication media may comprise a wire, a cable, a metal lead, a printed circuit board (PCB), a substrate, a switching structure, a semiconductor material, a twisted pair, a coaxial cable, an optical fiber, a transmitted signal, etc. Examples of wireless communication media may comprise acoustic, radio frequency (RF) spectrum, infrared and other wireless media.

Step 102: first encoded information extracted from a first optical signal corresponding to environmental light of the visitor's current environment (namely, a space outside the door) is obtained.

In some embodiments, the environmental light of the visitor's current environment may be captured by the electronic eye in the door device. The optical signal corresponding to the environmental light is used as the first optical signal. Encoding information may be embedded in the first optical signal. The electronic eye 2 may extract first encoded information from the first optical signal after receiving it. In some embodiments, the first optical signal may be converted into a high-low-level signal by a conversion circuit integrated in the electronic eye 2. The high-low-level signal may be amplified and outputted to a data transmission unit integrated in the electronic eye 2. The data transmission unit decodes the high-low-level signal to extract the first encoded information and transmit the first encoded information to the control terminal.

The first optical signal may comprise a coded light signal emitted by an illumination lamp 3, and may also comprise an optical signal emitted by an electronic device carried by a visitor. In some embodiments, the first optical signal may also be a hybrid optical signal of multiple optical signals.

It would be understood that the illumination lamp 3 may be in an ON state or switched to an ON state when there is a visitor.

The illumination lamp 3 may optionally be any light source that may be quickly modulated to encode information without being noticed by a human observer. For instance, the illumination lamp 3 may be an LED that flickers at a high frequency so as to prevent human eyes from discomfort. In some embodiments, the illumination lamp 3 sends the modulated encoded information in a form of coded light (such as stroboflash) to the electronic eye 2. The information may be sent to the control terminal for visitor identification.

It would be understood that the access control system further comprises a transmission drive circuit for driving the illumination lamp 3 to transmit the coded light, both of which may be integrated in one transmitter. In some embodiments, the illumination lamp in the transmitter may be made of a plurality of LEDs connected in series or in parallel. The transmission drive circuit in the transmitter outputs a driving signal to the illumination lamp so as to drive the illumination lamp to emit coded and modulated light.

Figure 3:
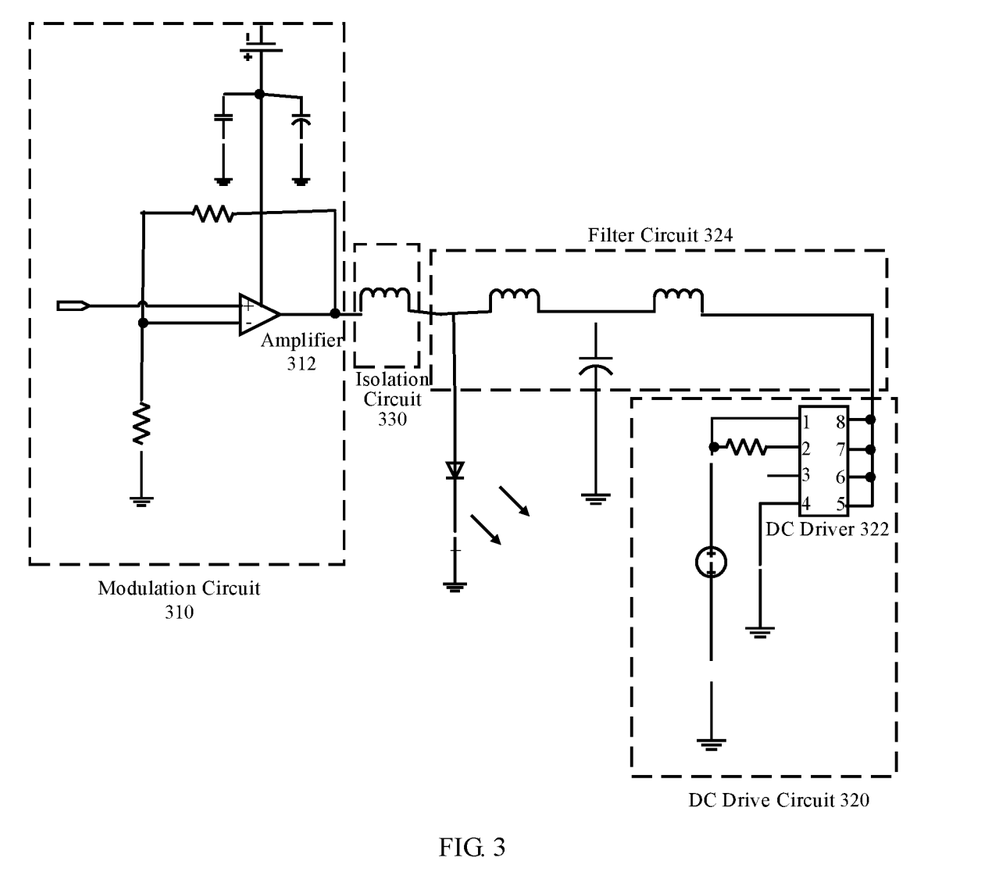
FIG. 3 is a structural schematic view of a transmission drive circuit according to an embodiment of the present disclosure.

FIG. 3 illustrates a structural schematic view of the transmission drive circuit according to an embodiment of the present disclosure. As shown in FIG. 3, the transmission drive circuit comprises a modulation circuit 310 and a DC drive circuit 320. The modulation circuit 310 comprises an emitter amplifier 312 and a resistor that constitute an emitter amplifying circuit. The DC drive circuit 320 is used to drive an illumination lamp and comprises a DC driver 322 and a filter circuit 324. The filter circuit 324 is composed of a set of inductors and configured to receive a signal outputted by the DC driver to filter it before outputting it to the illumination lamp, thereby stably driving the illumination lamp to emit light. The modulation circuit 310 may be configured to module an AC signal to a bias current of the DC drive circuit, to module encoded information into the optical signal of the illumination lamp. The illumination lamp emits light under the drive of a DC voltage with varying amplitudes. There may be an isolation circuit 330 between the modulation circuit 310 and the DC drive circuit 320. The isolation circuit 330 comprises a capacitor to prevent signal interference between the modulation circuit and the DC drive circuit.

In some embodiments, the illumination lamp of the access control system may also be utilized for supplemental local networking in an outdoor corridor. This can be used to temporarily open a door lock, which is much safer than Wi-Fi. Take the most popular and safest fingerprint password lock for example. In some particular scenes, fingerprint password locks may not be applicable for, e.g., the elderly with shaking hands or children with low height. Further, finger recognition may be sometimes affected if a finger is at an over-low temperature or stained. A password formed by simple digits or alphabets is easy to forget or leak, and shall not be used as a common unlocking manner. In addition, some special visitors, such as a courier delivering a valuable object, may also need a temporary access.

According to an embodiment of the present disclosure, in such a scene, a visitor may receive a temporary password pre-edited by the illumination lamp with a portable intelligent device. Or the intelligent device may send an unlocking request to the electronic eye. The visitor can successfully receive the temporary password after receiving permission for the request through the control terminal from a user. Exemplarily, before giving permission, the user may request the visitor to upload its fingerprint information or true personal registration information. Since this is implemented in a very confidential way, and only a visitor that is particularly informed by a family member, acquaintance or host may put it into effect, a higher safety factor is achieved.

Step 103: the visitor is identified as an authorized visitor when the image matches with a preset image and the first encoded information contains preset encoded information. In some embodiments, the preset image may be image information of the authorized visitor that is pre-stored in the control terminal. The preset encoded information is consistent with encoded information that is encoded or embedded in the optical signal of the illumination lamp.

The received image and the obtained first encoded information may be respectively compared with the preset image and the preset encoded information at the control terminal. When both two comparison results satisfy preset conditions, the visitor can be determined as the authorized visitor.

Alternatively, the control terminal may present the received visitor image to a user for checking, and receive the user's checking result as to whether the visitor is an authorized visitor. When the checking result indicates the visitor is an authorized visitor and the first encoded information is the preset encoded information, the visitor is determined as the authorized visitor. At this time, the control terminal may send a control instruction to the door device so as to instruct the door device to open the door.

In addition to the acquired real-time image of the current visitor outside the door, the visitor identification method according to the embodiment of the present disclosure also uses the obtained encoded information in the environmental light of the visitor's current environment to identify whether the visitor is an authorized visitor. Since acquisition of environmental light may possibly be affected when a visitor provides false image information, which may in turn lead to incorrect extraction of encoded information from the environmental light, the visitor identification method according to the embodiment of the present disclosure allows to identify an unauthorized visitor more accurately. This will ensure that a user receives true visitor information, thereby improving the reliability of visitor identification and guaranteeing user security.

Figure 4:
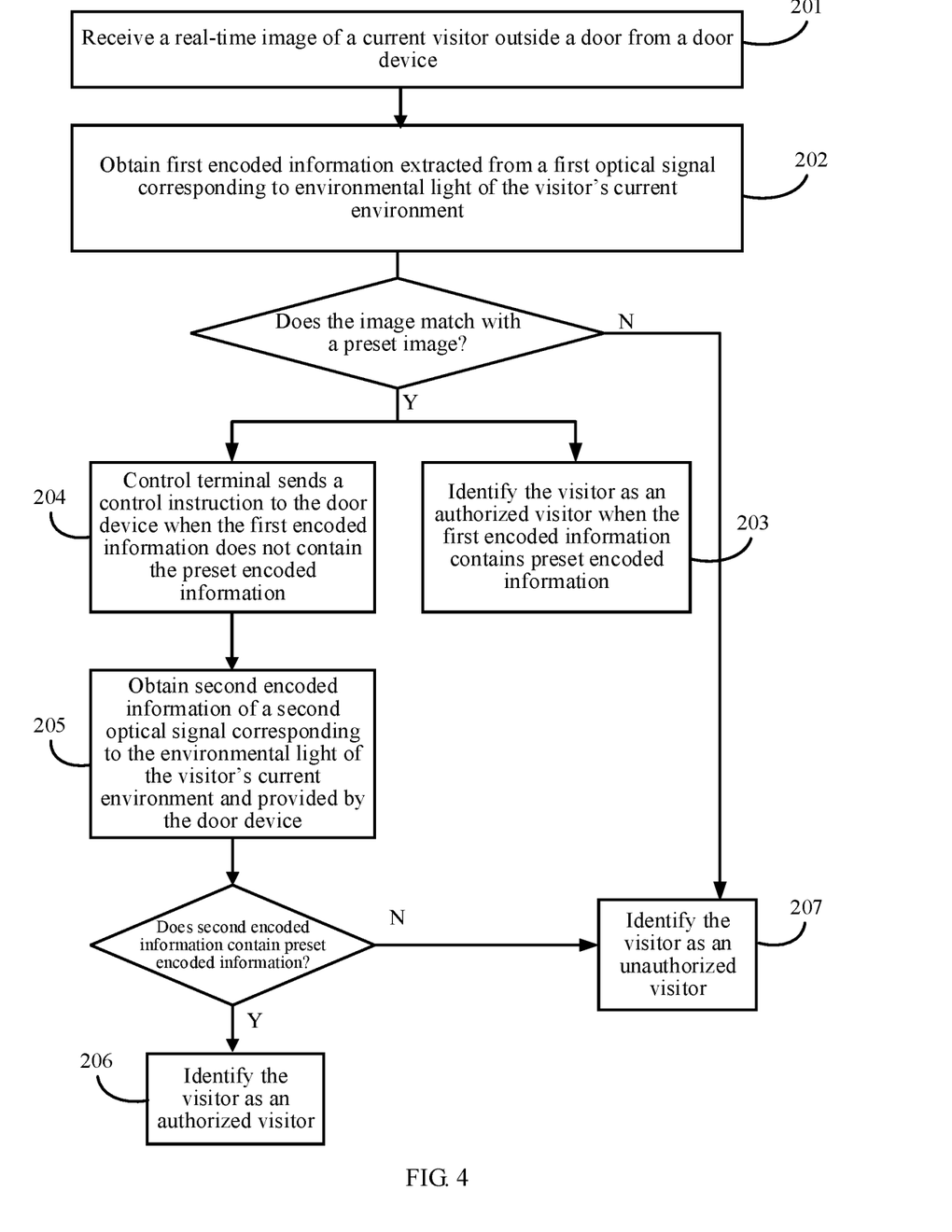
FIG. 4 is a flowchart of a method according to another embodiment of the present disclosure.

FIG. 4 illustrates a flowchart of a method according to another embodiment of the present disclosure. The visit identification method according to the embodiment may be implemented by a control terminal and comprises the following steps.

Step 201: a real-time image of a current visitor outside a door from a door device is received by a control terminal.

Step 202: first encoded information extracted from a first optical signal corresponding to environmental light of the visitor's current environment is obtained by the control terminal. In some embodiments, the door device may capture the first optical signal corresponding to the environmental light, and demodulate the first optical signal so as to extract the first encoded information therein.

Step 203: the control terminal may identify the visitor as an authorized visitor when the image matches with a preset image and the first encoded information contains preset encoded information. The preset image is image information of the authorized visitor pre-stored in the control terminal, and the preset encoded information is consistent with encoded information embedded in an optical signal of an illumination lamp for illuminating the visitor's current environment. It would be understood that when there are multiple authorized visitors, each of them has a corresponding preset image stored in the control terminal. In some embodiments, a human face in the received image may be recognized so as to be compared with the preset image. When the human face in the received image matches with that in some preset image, it means the visitor is one who was previously authorized. Similarly, the obtained first encoded information may be compared with the preset encoded information so as to determine whether the coded light emitted from the illumination lamp is correctly received. It would be understood that when the first encoded information does not contain the preset encoded information, it means the coded light emitted by the illumination lamp may not be correctly received by the door device due to e.g., shielding. Thus, it may be directly determined that the visitor is an unauthorized visitor.

It may be understood that although the method in FIG. 4 is exemplified as implementing the matching step for image first, the matching step may, alternatively, be implemented after determining whether the first encoded information contains the preset encoded information.

In the embodiment of the present disclosure, the implementation of steps 201-203 is similar to the implementation of steps 101-103 in the above embodiment.

In other embodiments, when the first encoded information does not contain the preset encoded information, the method further comprises the following additional steps.

Step 204: a control terminal may send a control instruction to the door device when the first encoded information does not contain the preset encoded information. The control instruction may instruct the door device to control a fill lamp in the environment to be turned on so as to supplement the environmental light.

When the first encoded information does not contain the preset encoded information, it indicates that optical communication between the illumination lamp and the electronic eye 2 is blocked. This may be caused due to blocking of the optical signal emitted from the illumination lamp by an electronic device carried by an unauthorized visitor, or the optical signal may be blocked because the authorized visitor is too close to the electronic eye 2. As such, the fill lamp needs to be turned on to supplement the current environmental light so as to avoid misidentification of the visitor.

It would be understood that the encoded information in light emitted by the fill lamp may be consistent with the encoded information in the optical signal emitted by the illumination lamp. Thus, there will not be any interference to the encoded information received by the control terminal.

Optionally, before the step 204, the method further comprises the following steps:

First step: obtaining position information of the visitor relative to the door device as provided by the door device; and Second step: setting a target luminous flux of the fill lamp according to the position information and a preset luminous flux. The preset luminous flux is the minimum luminous flux required for transmitting the preset encoded information to the door device.

A smooth communication between the illumination lamp and the electronic eye can be ensured when the luminous flux received by the electronic eye is at least up to the preset luminous flux, and thereby the control terminal can finally receive encoded information that contains the preset encoded information. Thus, the target luminous flux of the fill lamp may be first determined so that the luminous flux of the environmental light of the visitor's environment supplemented by the fill lamp reaches the preset luminous flux.

With reference to FIG. 1, suppose a length of perpendicular from the illumination lamp 3 to the door body 5 is L1, a length of perpendicular from the fill lamp 4 to the door body 5 is L2, the height of the electronic eye 2 is h, the distance between the electronic eye 2 and the sidewall is in, and the height of the wall body is H.

The illumination lamp 3 and the (optional) fill lamp 4 may both be controlled acoustically and optically or controlled by a sensing signal sensed by other sensors (e.g., an occupancy sensor). For instance, the illumination lamp 3 may be turned on in response to a volume in the environment exceeding a predetermined threshold or environmental light with brightness below a predetermined threshold. Under normal conditions, the illumination lamp 3 and the (optional) fill lamp 4 may be in an OFF state without sending any information to a user. When there is a visitor, the illumination lamp 3 is a major lamp that provides both illumination and communication functions. When the visitor is too close to the electronic eye 2, it may block the light emitted from the top wall by the illumination lamp 3 from reaching the electronic eye 2, thereby reducing the luminous flux and the optical carrier amplitude thereof. Thus, the communication between the illumination lamp 3 and the electronic eye 2 may be interfered, which makes the control terminal not receive the encoded information of the illumination lamp properly. In order to reduce a rate of false positive, the illumination lamp 3 and the fill lamp 4 form a coordinating system, and the fill lamp 4 supplements the amount of modulated light that reaches the electronic eye so as to ensure stable transmission.

In an example, an angle of a field of view (FOV) of a camera in the electronic eye is set to be 120°. Suppose both the illumination lamp and the fill lamp have a divergence angle of 120°, which is regarded as uniform spherical radiation by default, and the luminous flux reaching the electronic eye is proportional to a radiation angle. If a boundary condition of the illumination lamp is set to be $\alpha<60°$, wherein $\alpha$ is an angle between the boundary of the light radiation of the illumination lamp and its radiation centre line, it can be derived that $L1<\sqrt{3}$ (H-h). If a boundary condition of the fill lamp is set to be $\theta<60°$, wherein $\theta$ is an angle between the boundary of the light radiation of the fill lamp and its radiation centre line, a critical limit of $$\frac{\sqrt{3}}{3}m < L2 < \sqrt{3}\,m$$

can be derived. Optionally, 70 cm≥L1>L2.

Suppose when the distance between the visitor and the electronic eye is 30 cm, the luminous flux received by the electronic eye 2 is the minimum luminous flux M ensuring smooth communication. When the distance y between the visitor 1 and the electronic eye 2 decreases gradually, the effective luminous flux received by the electronic eye 2 from the illumination lamp 3 decreases gradually. The target luminous flux X which needs to be supplemented can be calculated according to the following formula:

$$X = M[1-(1/e)^{3-y/10}] (y \leq 30 \text{ cm}) \quad (1)$$

wherein X is the target luminous flux, M is the preset minimum luminous flux and y is a length of a perpendicular from visitor to the electronic eye.

The above is just an example. It would be understood that when, in the access control system, the fill lamp 4 is e.g. installed on the side wall at other angle, the above boundary conditions will change accordingly. Therefore, the installation angle and position of the fill lamp may be adapted to actual demands. Values in the access control system, such as L1 and L2, may also be other numerical values.

After obtaining the value of the target luminous flux, the step 204 may comprise: sending a control instruction to the door device by the control terminal so as to instruct the door device to control turning-on of the fill lamp and supplement the environmental light according to the target luminous flux.

Step 205: second encoded information of a second optical signal corresponding to the environmental light of the visitor's current environment and provided by the door device is obtained.

The second optical signal is generated when the fill lamp is turned on to supplement the first optical signal. At this time, the second optical signal may be acquired by, e.g., an optical signal acquisition module integrated in the electronic eye 2 and converted into a high-low-level signal by a conversion circuit integrated in the electronic eye. The signal is amplified and outputted to a data transmission unit integrated in the electronic eye 2. The data transmission unit decodes it to obtain the second encoded information and then transmits the second encoded information to the control terminal. The control terminal may make determination on the visitor's identity according to the second encoded information.

Step 206: the visitor is identified as an authorized visitor when the second encoded information contains the preset encoded information and the image matches with the preset image.

If the second encoded information received by the control terminal contains the preset encoded information and the image matches with the preset image after light supplementing by the fill lamp, it may be determined that the visitor is an authorized visitor.

Step 207: the visitor is identified as an unauthorized visitor when the second encoded information does not contain the preset encoded information. In some embodiments, when a received real-time image of the visitor does not match with a preset image, it is also possible to directly identify the visitor as an unauthorized visitor.

If the second encoded information received by the control terminal still does not contain the preset encoded information after light supplementing by the fill lamp, no matter if the image obtained by the control terminal matches with a preset image, it can be determined that the image obtained by the control terminal is not a true image of the visitor, but may likely be an image falsified by the unauthorized visitor using a video. At this time, it can be determined that the visitor is an unauthorized visitor.

With reference to FIG. 1, generally speaking, when there is a visitor, the electronic eye may normally start to observe the visitor's profile from a distance of 3 meters. The final standing position of the visitor is usually 30 cm to 50 cm from the door device. If an unauthorized visitor wants to achieve a verisimilar effect by falsifying an image using a pre-recorded video and transmitting the falsified image to the control terminal for a user to check, the unauthorized visitor has to place the display terminal carried with him in a position at a distance closer to the door device, and said distance is in reverse proportion to the size of the image finally displayed by the control terminal. Due to the limited space outside the door, such as the corridor space, the moving distance of a visitor actually observed by the user will not exceed 1 m. Under normal circumstances, an authorized visitor, when standing in front of the door device, will not be too close to the door body, but leave a certain gap. Thus, the optical signal will not be completely blocked. In the case of deceiving the electronic eye using a video, it will be inconvenient for an unauthorized visitor to carry a larger display terminal, instead, he usually carries a display terminal of about 7". Thus, in order to imitate a true portrait scene as vividly as possible, the display terminal needs to be close to the electronic eye. In doing so, when the unauthorized visitor places the display terminal in front of the electronic eye, the visible light communication between the illumination lamp and the electronic eye will surely be blocked. Thus, even though the fill lamp is turned on to supplement light for the first optical signal, the display terminal carried by the unauthorized visitor will still block the supplementary light because it is too close to the electronic eye. Therefore, communication between the illumination lamp and the electronic eye will be hindered, which causes the second encoded information received by the control terminal not to contain the preset encoded information as well.

According to the embodiment of the present disclosure, by means of the cooperative work between the illumination lamp and the fill lamp, the fill lamp supplements the luminous flux of the modulated light containing the second encoded information that can reach the electronic eye, so as to guarantee stable signal transmission. This also reduces false positive rate, that is, an authorized visitor is misidentified as an unauthorized visitor due to light occlusion caused by the authorized visitor being too close to the electronic eye.

It would be understood that in some embodiments, a visitor may be identified as an unauthorized visitor as long as the acquired image does not match with the preset image.

It should be noted that the visitor identification method according to the embodiment above may be applied in an access control system. The door device of the access control system may further comprise a door lock control module configured to receive a control instruction from the control terminal so as to control the locking and unlocking of the door lock. When the control terminal determines a visitor as an authorized visitor, the control terminal may send a control instruction comprising an unlocking instruction to the door lock control module so as to control the unlocking of the door lock.

However, it would be understood that a user may send an unlocking or locking instruction to the door lock control module via the control terminal according to actual demands. For instance, if the access control system does not store information of a rare visitor, then there is no preset image matching with an acquired image. In this case, when the encoded information received by the control terminal contains the preset encoded information, the user may still send an unlocking instruction to the door lock control module with the control terminal to control the opening of the door body, though the control terminal determines the visitor as an unauthorized visitor. But it should be noted that before the door opening, it has to make sure that the encoded information received by the control terminal contains the preset encoded information so as to guarantee the visitor outside the door is a real visitor, rather than a visitor's image falsified with an electronic device by an unauthorized visitor. Likewise, even though the control terminal determines the visitor as an authorized visitor, the user may also send a control instruction comprising a locking instruction to the door lock control module by the control terminal to prohibit the opening of the door.

In the visitor identification method according to the embodiment of the present disclosure, the visitor's image and the first encoded information corresponding to the first optical signal are acquired respectively and whether a visitor is an authorized visitor is determined based on both of them. This greatly improves the probability of receiving true visitor information at user side, enhances visitor identification reliability and guarantees user security.

Figure 5:
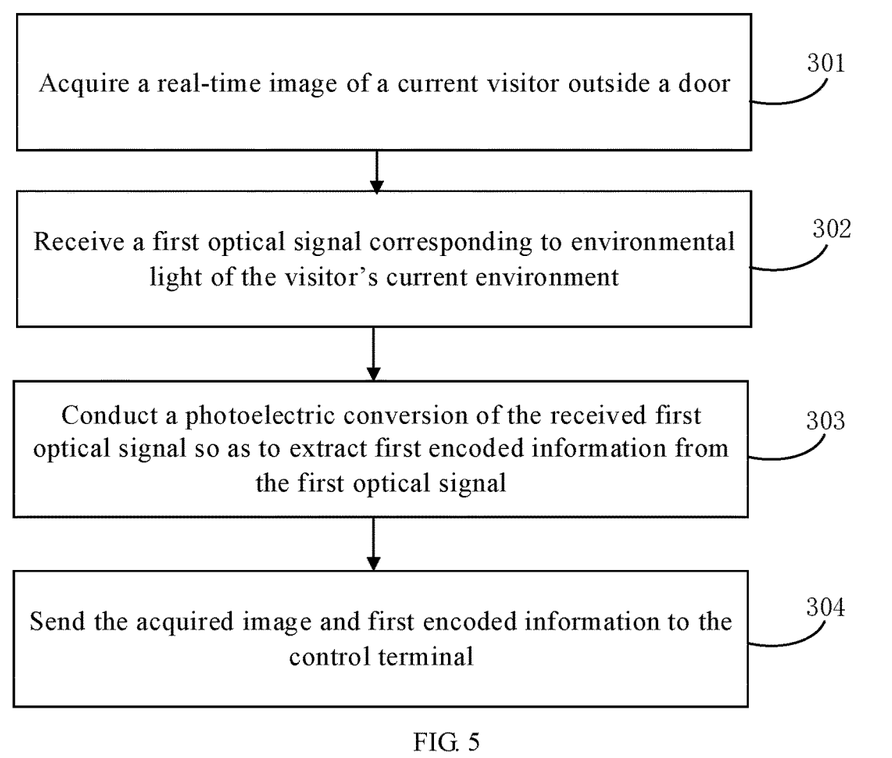
FIG. 5 is a flowchart of a method according to a further embodiment of the present disclosure.

FIG. 5 illustrates a flowchart of a method according to a further embodiment of the present disclosure. Such a visitor identification method may be applied in the door device of the access control system. With reference to FIG. 5, the method comprises the following steps.

Step 301: a real-time image of a current visitor outside a door is acquired.

The door device may comprise an image acquisition unit. The real-time image of a current visitor outside a door may be acquired by the image acquisition unit. It would be understood that the acquired image is an image comprising a human face.

Step 302: a first optical signal corresponding to environmental light of the visitor's current environment is received.

The door device may comprise an optical signal acquisition module. In the step, the environmental light of the visitor's current environment may be received by the optical signal acquisition module. The optical signal corresponding to the environmental light is used as the first optical signal.

Step 303: a photoelectric conversion of the first optical signal is conducted so as to extract first encoded information from the first optical signal.

The door device may also comprise a conversion circuit and a data transmission unit. In the step, the first optical signal may be converted into a high-low-level signal via the conversion circuit. The high-low-level signal may be amplified and then outputted to the data transmission unit. The data transmission unit, for example, decodes the high-low-level signal to extract the first encoded information.

Step 304: the acquired image and first encoded information are sent to the control terminal. The control terminal may identify the visitor as an authorized visitor when it is determined that the acquired image matches with a preset image and the first encoded information contains preset encoded information. The preset image is pre-stored image information of the authorized visitor, and the preset encoded information is consistent with encoded information embedded in an optical signal from an illumination lamp for illuminating the environment.

In the visitor identification method according to the embodiment of the present disclosure, the visitor image acquired by the door device and the first encoded information extracted from the first optical signal are sent to the control terminal. This makes it possible to determine the visitor's identity by ways other than image, which greatly improves the probability of receiving true visitor information at user side, enhances visitor identification reliability and guarantees user security.

Figure 6:
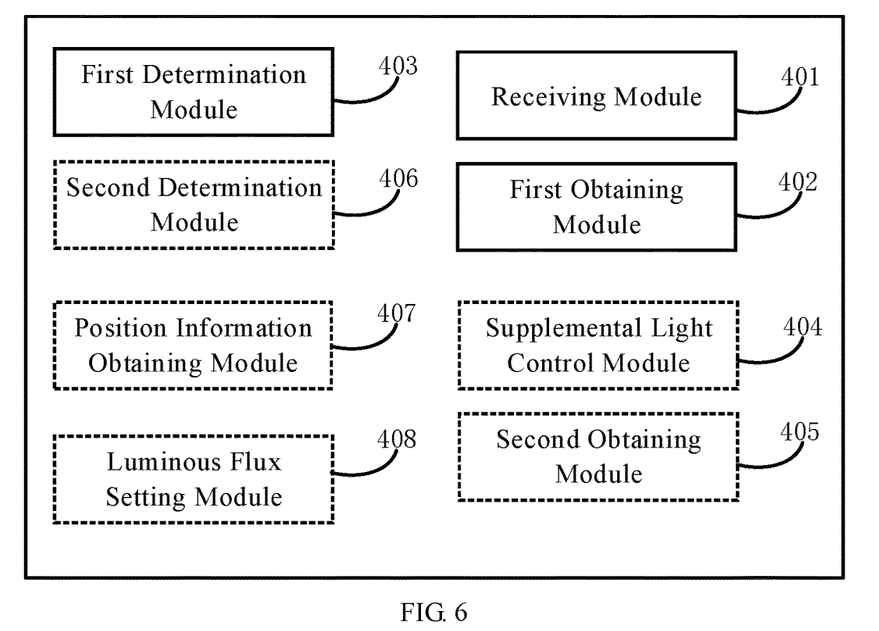
FIG. 6 is a structural block diagram of a device according to an embodiment of the present disclosure.

FIG. 6 illustrates a structural block diagram of a device according to an embodiment of the present disclosure. The device may be applied in an access control system as a control terminal. With reference to FIG. 6, a visitor identification device comprises a receiving module 401, a first obtaining module 402 and a first identification module 403.

The receiving module 401 is configured to receive a real-time image of a current visitor outside a door from a door device. The first obtaining module 402 is configured to obtain first encoded information extracted by the door device from a first optical signal corresponding to environmental light of the visitor's current environment. The first identification module 403 is configured to identify the visitor as an authorized visitor when the image matches with a preset image and the first encoded information contains preset encoded information. The preset image is pre-stored image information of the authorized visitor, and the preset encoded information is consistent with encoded information embedded in an optical signal from an illumination lamp for illuminating the environment.

In some embodiments, the visitor identification device further comprises: a supplemental light control module 404 configured to send a control instruction to the door device when the first encoded information does not contain the preset encoded information. The control instruction instructs the door device to control a fill lamp to be turned on so as to supplement the environmental light.

In some embodiments, the visitor identification device further comprises: a second obtaining module 405 configured to obtain second encoded information extracted by the door device from a second optical signal corresponding to the environmental light of the visitor's current environment.

In some embodiments, the visitor identification device further comprises: a second identification module 406 configured to identify the visitor as an authorized visitor when the second encoded information contains the preset encoded information and the image matches with the preset image. When the second encoded information does not contain the preset encoded information, the visitor is identified as an unauthorized visitor; and when the image does not match with the preset image, the visitor is identified as an unauthorized visitor.

In some embodiments, the visitor identification device further comprises: a position information obtainer 407 configured to obtain position information of the visitor relative to the door device as provided by the door device when the first encoded information does not contain preset encoded information.

In some embodiments, the visitor identification device further comprises: a luminous flux setting module 408 configured to set a target luminous flux of the fill lamp according to the position information and a preset luminous flux. The preset luminous flux is the minimum luminous flux required for transmitting the preset encoded information to the door device. Correspondingly, the supplemental light control module is configured to send a control instruction to the door device. The control instruction comprises the target luminous flux so as to instruct the door device to control the fill lamp to supplement the environmental light according to the target luminous flux.

It would be understood that although the first and second identification modules are exemplified as two separate modules, they may be integrated together in practice.

The visitor identification device according to the embodiment of the present disclosure not only determines the visitor's identify by images, but also considers the first encoded information in the first optical signal corresponding to the environmental light at the same time, which ensures that the visitor information received by a user terminal is true, thereby enhancing visitor identification reliability and guaranteeing user security.

Figure 7:
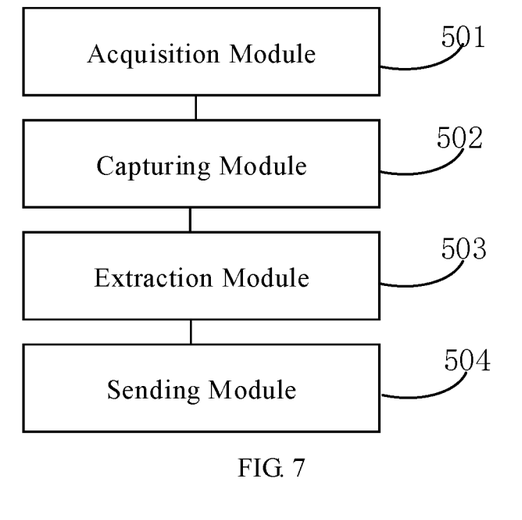
FIG. 7 is a structural block diagram of a device according to another embodiment of the present disclosure.

FIG. 7 illustrates a structural block diagram of a device according to another embodiment of the present disclosure. The device is a visitor identification device and may be applied in the access control system as a door device. With reference to FIG. 7, the visitor identification device comprises an acquisition module 501, a capturing module 502, an extraction module 503 and a sending module 504.

The acquisition module 501 may be configured to acquire a real-time image of a current visitor outside a door. The acquisition module 501 may be, for example, a camera or a video camera. The capturing module 502 may be configured to capture a first optical signal corresponding to environmental light of the visitor's current environment. In some embodiments, the capturing module 502 may be an image sensor, such as a camera, and in particular a rolling shutter camera, for capturing an image of light emitted by an illumination lamp. The extraction module 503 may be configured to extract first encoded information from the captured first optical signal. In some embodiments, the extraction module 503 may be an image analyzing module, such as an image processor, for detecting first encoded information of coded light from the captured image. The sending module 504 may be configured to send the image and the first encoded information to the control terminal so that the control terminal determines whether the visitor is an authorized visitor according to the image and the first encoded information. For instance, the control terminal identifies the visitor as an authorized visitor when it is determined that the image matches with the preset image and the first encoded information contains the present encoded information. The preset image is pre-stored image information of the authorized visitor, and the preset encoded information is consistent with encoded information embedded in the optical signal from an illumination lamp for illuminating the environment.

In some embodiments, the visitor identification device further comprises: a receiving module 505 configured to receive a control instruction from a control terminal. The visitor identification device may conduct a corresponding action according to the received control instruction, e.g., it may decide whether to open the door or not.

In some embodiments, the control instruction comprises a command to turn on the fill lamp in the environment, and the visitor identification device further comprises: a control module configured to control a fill lamp to be turned on so as to supplement environmental light. Optionally, the control instruction further comprises information related to a target luminous flux of the fill lamp, and the control module is further configured to control the fill lamp to supplement the environmental light according to the target luminous flux.

The visitor identification device provided by the embodiment of the present disclosure determines whether a visitor is an authorized visitor by acquiring an image of the visitor and providing the first encoded information extracted from the environmental light to the control terminal, so as to ensure that true visitor information is received at user side, which enhances visitor identification reliability and guarantees user security.

Figure 8:
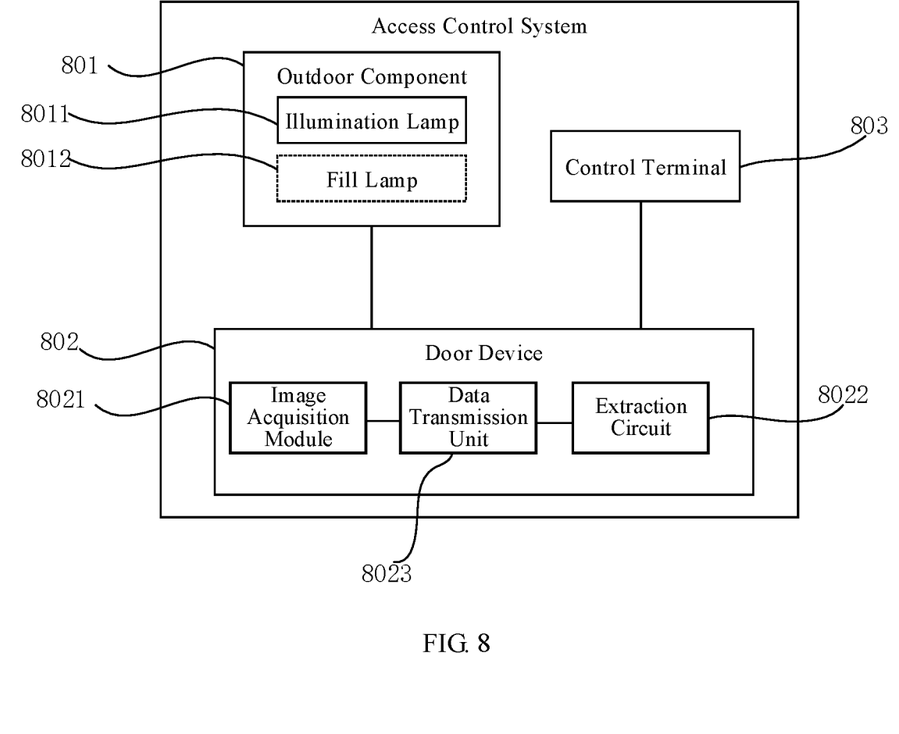
FIG. 8 is a structural block diagram of an access control system according to an embodiment of the present disclosure.

FIG. 8 illustrates a structural block diagram of an access control system according to an embodiment of the present disclosure. With reference to FIG. 8, the access control system comprises an outdoor component 801, a door device 802 and a control terminal 803.

The outdoor component 801 comprises an illumination lamp 8011 for illuminating and for sending coded light comprising preset encoded information.

The door device 802 comprises: an image acquirer 8021 configured to acquire a real-time image of a current visitor outside a door; an extraction circuit 8022 configured to capture environmental light of the visitor's current environment and extract first encoded information from a first optical signal corresponding to the environmental light; and a data transmission unit 8023 configured to transmit the image and the first encoded information to the control terminal.

In some embodiments, the door device 802 may be a visitor identification device according to an embodiment of the present disclosure, such as the visitor identification device with reference to FIG. 7.

The control terminal 803 is configured to receive the image and the first encoded information from the door device 802. When the image matches with a preset image and the first encoded information contains preset encoded information, the control terminal 803 identifies the visitor as an authorized visitor. The preset image is pre-stored image information of the authorized visitor. The preset encoded information is consistent with encoded information embedded in an optical signal of an illumination lamp for illuminating the environment.

In some embodiments, the control terminal 803 may be a visitor identification device according to an embodiment of the present disclosure, such as the visitor identification device with reference to FIG. 6.

In an optional embodiment, the outdoor component 801 further comprises a fill lamp. The control terminal is further configured to send a control instruction to the door device when the first encoded information does not contain the preset encoded information. The control instruction instructs the door device to control a fill lamp to be turned on so as to supplement the environmental light.

According to the access control system provided by the embodiment of the present disclosure, the visitor's image and the first encoded information corresponding to the coded light emitted by the illumination lamp are acquired respectively and whether a visitor is an authorized visitor is determined based on both of them. This ensures that true visitor information is received at user side, thereby enhancing visitor identification reliability and guaranteeing user security.

Various techniques may be described herein in the general context of software, hardware elements, or program modules. Generally, such modules include routines, programs, objects, elements, components, data structures, and so forth that perform particular tasks or implement particular abstract data types. The terms "module", "functionality" and "component" as used herein generally represent software, firmware, hardware (e.g., circuit), or a combination thereof. The features of the techniques described herein are platform-independent, meaning that the techniques may be implemented on a variety of computing platforms having a variety of processors.

An implementation of the described modules and techniques may be stored on or transmitted across some form of computer readable medium. The computer readable medium may include a variety of medium that may be accessed by the computing device. By way of example, and not limitation, computer readable medium may include "computer readable storage medium" and "computer readable signal medium".

"Computer readable storage medium" refers to medium and/or devices that enable persistent storage of information and/or storage that is tangible, in contrast to mere signal transmission, carrier waves, or signals per se. Thus, computer readable storage medium refers to non-signal bearing medium. The computer readable storage medium includes hardware such as volatile and non-volatile, removable and non-removable medium and/or storage devices implemented in a method or technology suitable for storage of information such as computer readable instructions, data structures, program modules, logic elements/circuits, or other data. Examples of computer readable storage medium may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible medium, or article of manufacture suitable to store the desired information and which may be accessed by a computer. For the foregoing method embodiments, for the sake of simple description, they are all expressed as a series of action combinations, but those skilled in the art should understand that the present invention is not limited by the described action sequence, because certain steps may be performed in other sequences or concurrently in accordance with the present invention. In addition, those skilled in the art should also understand that the embodiments described in the specification are all preferred embodiments, and the actions and modules involved are not necessarily required by the present invention.

Each of the embodiments in this specification is described in a progressive manner. Each of the embodiments focuses on the differences from other embodiments, and reference can be made to each other for the same and similar parts among the embodiments. For system embodiments, since they are basically similar to the method embodiments, the description thereof is relatively simple, and reference can be made to the part of the description of the method embodiments for relevant contents.

Although optional embodiments of the present disclosure have been described, once those skilled in the art have learned about basic creative concepts, additional changes and modifications may be made to these embodiments. Therefore, the appended claims are intended to be interpreted as including alternative embodiments and all changes and modifications falling within the scope of the embodiments of the present disclosure.

The above mentioned is only the specific embodiments of the present disclosure; however, the scope of protection of the present disclosure is not limited thereto. Any change or replacement easily conceivable by those skilled in the art within the scope of the technology disclosed in the present disclosure shall be covered by the scope of protection of the present disclosure. Therefore, the scope of protection of the present disclosure shall depend on the scope of protection of the claims.

The invention claimed is:

1. A method for identifying a visitor, comprising:
  receiving a real-time image of a current visitor outside a door from a door device;
  obtaining first encoded information extracted by the door device from a first optical signal corresponding to environmental light of the visitor's current environment; and
  identifying the current visitor as an authorized visitor when the real-time image matches with a preset image and the first encoded information contains preset encoded information, wherein the preset image is pre-stored image information of the authorized visitor, and the preset encoded information is consistent with encoded information embedded in an optical signal of an illumination lamp for illuminating the environment.

2. The method for identifying a visitor according to claim 1, further comprising:
  sending a control instruction to the door device when the first encoded information does not contain the preset encoded information, the control instruction instructing the door device to control a fill lamp in the environment to be turned on so as to supplement the environmental light;
  obtaining second encoded information extracted by the door device from a second optical signal corresponding to the environmental light of the environment;
  identifying the current visitor as an authorized visitor when the second encoded information contains the preset encoded information and the real-time image matches with the preset image; and
  identifying the current visitor as an unauthorized visitor when the second encoded information does not contain the preset encoded information.

3. The method for identifying a visitor according to claim 2, wherein before supplementing the environmental light, the method further comprises:
  obtaining position information of the current visitor relative to the door device as provided by the door device;
  setting a target luminous flux of the fill lamp according to the position information and a preset luminous flux, wherein the preset luminous flux is the minimum luminous flux required for transmitting the preset encoded information to the door device; and
  sending a control instruction to the door device comprises:
  including the target luminous flux in the control instruction sent to the door device so as to instruct the door device to control the fill lamp to supplement the environmental light according to the target luminous flux.

4. The method for identifying a visitor according to claim 1, further comprising:
  identifying the current visitor as an unauthorized visitor when the real-time image does not match with the preset image.

5. The method for identifying a visitor according to claim 1 comprising steps performed by the door device:
  acquiring the real-time image of the current visitor outside the door;
  capturing the first optical signal corresponding to environmental light of the visitor's current environment;
  extracting the first encoded information from the first optical signal; and
  sending the real-time image and the first encoded information to a control terminal so that the control terminal identifies the current visitor as an authorized visitor when it is determined that the real-time image matches with the preset image and the first encoded information contains the preset encoded information.

6. The method for identifying a visitor according to claim 5, further comprising: receiving a control instruction from a control terminal, and deciding whether to open the door according to the control instruction.

7. The method for identifying a visitor according to claim 5, further comprising: receiving a control instruction from a control terminal, and controlling a fill lamp to be turned on according to the control instruction so as to supplement environmental light.

8. The method for identifying a visitor according to claim 7, wherein the control instruction further comprises information related to a target luminous flux of the fill lamp, and the method further comprises controlling the fill lamp to supplement the environmental light according to the target luminous flux.

9. A device for identifying a visitor comprising:
an acquirer configured to acquire a real-time image of a current visitor outside a door;
a capturer configured to capture a first optical signal corresponding to environmental light of the visitor's current environment;
an extractor configured to extract first encoded information from the first optical signal;
a sender configured to send the real-time image and the first encoded information to a control terminal so that the control terminal identifies the current visitor as an authorized visitor when it is determined that the real-time image matches with a preset image and the first encoded information contains preset encoded information, wherein the preset image is pre-stored image information of the authorized visitor, and the preset encoded information is consistent with encoded information embedded in an optical signal of an illumination lamp for illuminating the environment.

10. The device for identifying a visitor according to claim 9, further comprising: a receiver configured to receive a control instruction from a control terminal, and the device for identifying a visitor is configured to decide whether to open the door according to the received control instruction.

11. The device for identifying a visitor according to claim 9, further comprising: a controller configured to control a fill lamp in the environment to be turned on so as to supplement environmental light.

12. The device for identifying a visitor according to claim 11, wherein the control instruction further comprises information related to a target luminous flux of the fill lamp, and the controller is further configured to control the fill lamp to supplement the environmental light according to the target luminous flux.

13. An access control system, comprising:
an outdoor component comprising an illumination lamp, the optical signal sent by the illumination lamp being embedded with preset encoded information;
a door device comprising:
an image acquirer configured to acquire a real-time image of a current visitor outside a door;
an extractor configured to capture a first optical signal corresponding to environmental light of the visitor's current environment and extract first encoded information from the first optical signal; and
a transmitter configured to transmit the image and the first encoded information; and
a control terminal configured to receive an acquired image and the first encoded information from the door device, and to identify the visitor as an authorized visitor when the acquired image matches with a preset image and the first encoded information contains preset encoded information;
wherein the preset image is pre-stored image information of the authorized visitor, and the preset encoded information is consistent with encoded information embedded in an optical signal of an illumination lamp for illuminating the environment.

14. The access control system according to claim 13, wherein the outdoor component further comprises a fill lamp;
the control terminal is further configured to send a control instruction to the door device when the first encoded information does not contain the preset encoded information, the control instruction instructing the door device to control a fill lamp to be turned on; and
the fill lamp is configured to be turned on under the control of the door device so as to supplement the environmental light.

15. The access control system according to claim 13, wherein the control terminal comprises:
a receiver configured to receive the real-time image of the current visitor from the door device;
a first obtainer configured to obtain the first encoded information; and
a first identifier configured to identify the visitor as an authorized visitor when the first encoded information contains the preset encoded information and the real-time image matches with the preset image.

16. The access control system according to claim 15, wherein the control terminal further comprises:
a supplemental light controller configured to send a control instruction to the door device when the first encoded information does not contain the preset encoded information, the control instruction instructing the door device to control a fill lamp in the environment to be turned on so as to supplement the environmental light;
a second obtainer configured to obtain second encoded information extracted by the door device from a second optical signal corresponding to the environmental light of the environment; and
a second identifier configured to identify the visitor as an authorized visitor when the second encoded information contains the preset encoded information and the image matches with the preset image, and identify the visitor as an unauthorized visitor when the second encoded information does not contain the preset encoded information.

17. The access control system according to claim 16, wherein the control terminal further comprises:
a position information obtainer configured to obtain position information of the visitor relative to the door device as provided by the door device in response to no preset encoded information being contained in the first encoded information; and
a luminous flux setter configured to set a target luminous flux of the fill lamp according to the position information and a preset luminous flux, wherein the preset luminous flux is the minimum luminous flux required for transmitting the preset encoded information to the door device;
wherein the supplemental light controller is configured to include the target luminous flux in the control instruction sent to the door device so as to instruct the door device to control the fill lamp to supplement the environmental light according to the target luminous flux.

18. The access control system according to claim 13, wherein the control terminal comprises
a third identifier configured to identify the current visitor as an unauthorized visitor when the image does not match with the preset image.

19. A computer-readable storage medium including instructions that, when executed by a processor, cause the processor to perform the steps of a method according to claim 1.

* * * * *